Patented Dec. 30, 1924.

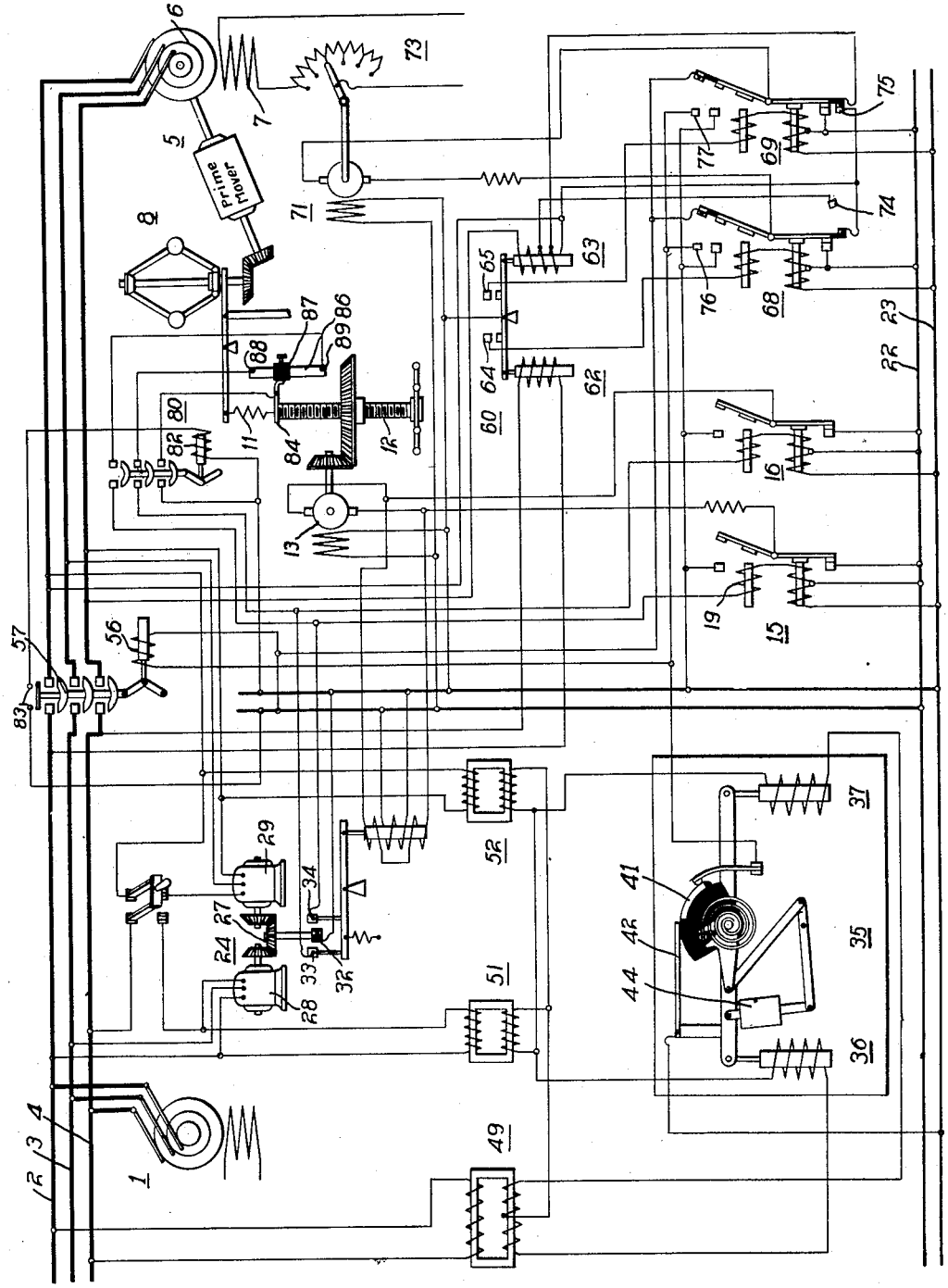

1,521,004

UNITED STATES PATENT OFFICE.

WILLIAM M. BRADSHAW AND JOHN H. ASHBAUGH, OF WILKINSBURG, PENNSYLVANIA, ASSIGNORS TO WESTINGHOUSE ELECTRIC AND MANUFACTURING COMPANY, A CORPORATION OF PENNSYLVANIA.

REGULATOR SYSTEM.

Application filed July 20, 1922. Serial No. 576,242.

*To all whom it may concern:*

Be it known that we, WILLIAM M. BRADSHAW, a citizen of the United States, and a resident of Wilkinsburg, in the county of Allegheny and State of Pennsylvania, and JOHN H. ASHBAUGH, a citizen of the United States, and a resident of Wilkinsburg, in the county of Allegheny and State of Pennsylvania, have invented a new and useful Improvement in Regulator Systems, of which the following is a specification.

Our invention relates to a system of control for a plurality of dynamo-electric machines and it has special relation to combined governing and regulating means therefor.

One object of our invention is to provide a system of the above-indicated character that shall be responsive to certain electrical characteristics of each of the machines to govern the parallel operation of said machines.

Another object of our invention is to provide a system of the above-indicated character that shall be responsive to certain electrical characteristics of said machines to connect said machines together when such characteristics thereof coincide and thereafter cause the above-mentioned governing means to operate at a predetermined setting.

A still further object of our invention is to provide a system of the above-indicated character that shall set the governor mechanism for one of the prime movers in accordance with certain operating characteristics of another of the prime movers and that shall subsequently reset said governor mechanism to coincide with the normal operating characteristics of the second-mentioned prime mover.

In a system wherein there are one or more dynamo-electric machines connected to a power circuit and it is desired to couple an additional machine to said circuit, governing means have been proposed to withhold the actual connection of the additional machine to the power circuit until certain electrical conditions thereof correspond to the electrical conditions of the power circuit. Such means are shown, for example, in the application of Wm. Bradshaw and J. H. Ashbaugh, Serial No. 576,241, filed July 20, 1922 (Case 9898), and assigned to the Westinghouse Electric & Manufacturing Company.

However, with such a system, when the additional machine is connected to the line, its governor mechanism is at that time set to maintain the conditions of the power circuit that existed at the time the machines were coupled together. When the auxiliary machine is connected to the line, the frequency of its currents is low with respect to the normal frequency of the currents of the power circuit. The governor mechanism of the main machine is striving to maintain that normal frequency while the governor mechanism of the auxiliary machine is tending to maintain the frequency existing when the machines were paralleled. It, therefore, becomes desirable to reset the governor mechanism of the auxiliary machine so that the setting will correspond to that of the primary machine, and to accomplish this operation automatically in its proper sequence.

Our invention will be best understood from the accompanying drawing, wherein the single figure is a diagrammatic illustration of the circuits and apparatus embodying our invention.

Since the governing mechanisms that are responsive to the phase coincidence of the currents of the respective machines to the balancing of the voltages of the respective machines, and to the balancing of the speeds of said machines to control the paralleling of said machines and the setting of the governor mechanism so that the auxiliary machine is operating at the proper speed when the machines are paralleled are described in detail in the above-entitled application, only a brief résumé thereof will be given in the present application, reference being made to the above-entitled application for the full and complete disclosure thereof.

In so far as practicable, the same reference numerals will be used herein, to indicate corresponding parts in the inventions of the two applications. As set forth in the above-entitled application, a main generator 1 is connected to a power circuit comprising conductors 2, 3 and 4. An auxiliary generator 5, having an armature 6 and a field winding 7, is adapted to be operated by a prime mover, such as a water wheel. The prime mover is adapted to be controlled by any standard governor mechanism, such as the illustrated flyball governor 8, which works against the tension of a spring 11. The tension of the spring 11 is adjustable by means of a screw mechanism 12, through the operation of a motor 13. The direction of rotation of the motor 13 is governed by reversing switches 15 and 16, which are energized from control bus bars 22 and 23.

The reversing switches are selectively controlled in accordance with the operation of a differential mechanism 24, the opposite portions of which are controlled by synchronous motors 28 and 29, which are respectively connected to the power circuit 2, 3, 4, and the circuit of the auxiliary generator 5. The intermediate gear 27 of the differential mechanism controls a contact member 32 that is adapted to engage either of contact members 33 and 34, which are respectively in circuit with the operating coils of switches 15 and 16.

An automatic synchronizer 35, which may be of any well-known construction, such as that exemplified by the patent to J. H. McMahan, No. 819,787, issued May 18, 1896, and assigned to the Westinghouse Electric & Manufacturing Company, is adapted to directly control the operation of the circuit-breaker 57 in accordance with the relation of the frequencies of the respective circuits.

The operating coils 36 and 37 of the synchronizer 35 are connected to transformers 49, 51 and 52, so as to be controlled in accordance with the frequency of the main and of the auxiliary generators, respectively. While the periodicity of the current of the auxiliary generator is at variance with that of the current of the power circuit, the current from the transformer 52 will traverse the halves of the secondary winding of transformer 49 in opposite directions, and will also traverse each of the electromagnets 36 and 37. When the periodicities of the currents coincide, the electromagnet 37 will exert a pull in excess of that of the electromagnet 36, thereby moving the brush 42 into engagement with the contact strip 41 to complete the circuit therethrough. The circuit thus completed extends to the operating coil 56 of the circuit-breaker 57, which serves to couple the main and the auxiliary machines in parallel.

The synchronizer 35 has a dash-pot 44 co-operating therewith whereby the operation of the synchronizer is rendered proportional to the rate at which the generators approach synchronism.

A voltage-balancing regulator 60 is also provided and comprises electromagnets 62 and 63 that are respectively energized from the power circuit and the circuit of the auxiliary generator. The balancer controls the contact members 64 and 65 to selectively close the circuit therethrough and thus control the operation of reversing switches 68 and 69, which are similar in construction to reversing switches 15 and 16, heretofore described. The reversing switches 68 and 69 control the direction of rotation of the motor 71 of a motor-operated rheostat 73 that is located in the circuit of the field-magnet winding 7 of the auxiliary generator. If the voltage of the auxiliary generator is lower than the voltage of the power circuit, the contact members 64 will be closed to operate reversing switch 68, thereby strengthening the field-magnet winding of the auxiliary generator. The reverse operation occurs if the voltage of the auxiliary generator is above that of the power circuit. The switches 68 and 69 control auxiliary contact members 76 and 77 which are connected in parallel relation across the circuit to the coil 56 of the circuit-breaker 57. Thus, when either of switches 68 and 69 is in operative position, the coil 56 will be short-circuited so that even though the synchronizer 35 completes the circuit to the circuit-breaker 57, the latter will not close until the voltages of the respective circuits balance.

As heretofore pointed out, it is desirable to reset the governor mechanism so that, after the machines are paralleled, the governing mechanism of the auxiliary generator will be caused to function in such manner that the auxiliary generator will take its proportionate share of the load.

According to the present invention, an auxiliary circuit-breaker 80 is provided, the circuit of the operating coil 82 of which extends through auxiliary contact members 83 that are operated by the main circuit-breaker 57. Upon the closure of the circuit-breaker 80, a circuit is completed from the control bus bar 22 to a terminal 84, which is secured to the screw shaft 12 and is adapted to engage a bar 86. The bar 86 is divided by a section of insulating material 87 and carries two terminals 88 and 89. The terminal 88 is connected to the operating coil 19 of the reversing switch 16 through the circuit-breaker 80. The terminal 89 is connected to the operating coil 19 of the reversing switch 15 through the auxiliary circuit-breaker 80.

When the setting of the governor mechanism is normal, the contact bar 84 will be opposite the section of insulating material 87 to engage therewith.

It will be assumed that the load upon the main generator has decreased the speed thereof. The functioning of the mechanism heretofore described has been to change the setting of the governor mechanism of the auxiliary generator to correspond to the speed of the main generator at the time the machines are paralleled. Therefore, the setting of the governor mechanism 8 is below normal and below that of the main generator governor mechanism.

The closure of the auxiliary circuit-breaker 80 completes a circuit from the control bus bar 22 through circuit-breaker 80, bar 84, the section of the bar 86 above the insulating material 87, terminal 88 and circuit-breaker 80, to the operating coil 19 of the reversing switch 16. This circuit will effect the energization of the motor 13 in a direction to cause it to lower the screw 12 and the bar 84 to increase the tension upon the spring 11. The operation of the motor 13 will cease when the bar 84 engages the insulating material 87, thereby breaking the circuit through the operating coil of the reversing switch 16. It will be recalled that, in this position, the setting of the governor mechanism is normal.

In order that the setting of the governor mechanism may be changed at will, the insulating member 87 is adapted to be adjustable upon the bar 86.

Modifications in the system and arrangement and location of parts may be made within the spirit and scope of our invention, and such modifications are intended to be covered by the appended claims.

We claim as our invention:—

1. The combination with a power circuit, a dynamo-electric machine, a prime mover therefor, means comprising a governor for governing the operation of said prime mover, switching means for connecting said machine to the power circuit, control means comprising a differential mechanism governed from said power circuit and said dynamo-electric machine, and synchronizing means adapted to control the energizing circuit for said switching means, of means for determining the setting of said governor after said machine is connected to said power circuit, said means comprising an auxiliary switching means adapted to govern the control means for said governor mechanism.

2. The combination with a power circuit, a dynamo-electric machine, switching means for connecting said machine to said circuit and control means therefor adapted to be operated in accordance with the phase and voltage indications of said circuit and the circuit of said machine, of governing mechanism for said dynamo-electric machine, control means therefor adapted to render the speed of said machine commensurate with said phase and voltage indications, and auxiliary switching means adapted to restore the setting of said governor mechanism to a predetermined normal position through the operation of a portion of said governor control means.

3. The combination with a power circuit, a dynamo-electric machine, switching means for connecting said machine to said circuit and control means therefor, of governor means for controlling the speed of said dynamo-electric machine, means comprising a motor for changing the setting of said governor means, and means operative upon the closing of said switching means for causing said motor to give a predetermined setting to said governor means.

4. The combination with a power circuit, a dynamo-electric machine, switching means for connecting said machine to said circuit and control means therefor adapted to be operated in accordance with the phase and voltage indications of said circuit and the circuit of said machine, of control means adapted to render the speed of said machine commensurate with said phase and voltage indications, and additional means adapted to cause said control means to operate said machine at a predetermined normal speed, said additional means comprising electroresponsive means operated by the closing of said switching means and adapted to thereafter govern said control means.

5. The combination with a power circuit, a dynamo-electric machine, switching means for connecting said machine to said circuit and control means therefor adapted to be operated in accordance with the phase and voltage indications of said circuit and the circuit of said machine, control means therefor comprising a differential mechanism operated from said power circuit and the circuit of said machine, contact mechanism operated thereby and electroresponsive means controlled from said contact mechanism, and auxiliary switching means energized upon the closure of said first-mentioned switching means and adapted to thereafter govern the operation of said control means.

6. The combination with a power circuit, a dynamo-electric machine, switching means for connecting said machine to said circuit and control means therefor adapted to be operated in accordance with the phase and voltage indications of said circuit and the circuit of said machine, of motor-operated governor mechanism for said machine, control means therefor comprising a differential contact mechanism operated thereby and reversing switches for said motor controlled from said contact mechanism, and auxiliary switching means operated upon the closure of said first-mentioned switching means and adapted to thereafter selectively control said reversing switches.

7. The combination with a power circuit, a dynamo-electric machine, switching means for connecting said machine to said circuit and control means therefor adapted to be operated in accordance with the phase and voltage indications of said circuit and the circuit of said machine, of motor-operated governor mechanism for said machine, control means therefor comprising a differential contact mechanism operated thereby and reversing switches for said motor controlled from said contact mechanism, and auxiliary switching means operated upon the closure of said first-mentioned switching means and adapted to thereafter selectively control said reversing switches, the circuit through said auxiliary switching means including means adapted to limit the operation of said governor motor.

8. The combination with a power circuit, a dynamo-electric machine, switching means for connecting said machine to said circuit and control means therefor adapted to be operated in accordance with the phase and voltage indications of said circuit and the circuit of said machine, of motor-operated governor mechanism for said machine, control means therefor comprising a differential contact mechanism operated thereby, reversing switches for said motor controlled from said contact mechanism and anti-hunting means co-operating therewith, and auxiliary switching means operated upon the closure of said first-mentioned switching means and adapted to thereafter selectively control said reversing switches.

9. The combination with a power circuit, a dynamo-electric machine, switching means for connecting said machine to said circuit and control means therefor adapted to be operated in accordance with the phase and voltage indications of said circuit and the circuit of said machine, of motor-operated governor mechanism for said machine, control means therefor comprising a differential contact mechanism operated thereby, reversing switches for said motor controlled from said contact mechanism and means for prematurely separating the engaged contact members, said means operating proportional to the counter-electromotive force of said governor motor, and auxiliary switching means operated upon the closure of said first-mentioned switching means and adapted to thereafter selectively control said reversing switches.

10. The combination with a power circuit, a dynamo-electric machine, switching means for connecting said machine to said circuit and control means therefor adapted to be operated in accordance with the phase and voltage indications of said circuit and the circuit of said machine, of motor-operated governor mechanism for said machine, control means therefor comprising a differential contact mechanism operated thereby, reversing switches for said motor controlled from said contact mechanism and anti-hunting means co-operating therewith, and auxiliary switching means operated upon the closure of said first-mentioned switching means and adapted to thereafter selectively control said reversing switches, the circuit through said auxiliary switching means including means adapted to limit the operation of said governor motor.

11. The combination with two disconnected dynamo-electric machines and means for connecting said machines together, of differential mechanism responsive to the speeds of said machines, motor-operated means controlled by the operation of said differential mechanism, reversing switches for controlling the operation of said motor, and automatic means for controlling said reversing switches after said machines are connected together.

12. The combination with two disconnected dynamo-electric machines and means for connecting said machines together, of differential mechanism responsive to the speeds of said machines, motor-operated means controlled by the operation of said differential mechanism, reversing switches for controlling the operation of said motor, and electroresponsive means for controlling said reversing switches after said machines are connected together.

13. The combination with two disconnected dynamo-electric machines and means for connecting said machines together, of differential mechanism responsive to the speeds of said machines, motor-operated means controlled by the operation of said differential mechanism, reversing switches for controlling the operation of said motor, means for preventing hunting action, and automatic means for controlling said reversing switches after said machines are connected together.

14. The combination with two disconnected dynamo-electric machines, means for connecting said machines together and control means therefor responsive to the voltage and frequency indications of the circuits of the respective machines, of means adapted to render the speed of one of said machines commensurate with said frequency indications, motor-operated means controlled thereby, and additional means adapted to cause said machine to operate at a predetermined normal speed through the further control of said motor-operated means after the machines are connected together.

15. The combination with two disconnected dynamo-electric machines, means for connecting said machines together, and control means therefor adapted to synchronize the speeds, voltages and phase relation of said machines prior to the operation of said connecting means and to be operated upon the obtaining of predetermined conditions of one of said machines, of additional means operated when said machines are synchronized and adapted to cause said machines to be operated at predetermined normal speeds.

16. The combination with two disconnected dynamo-electric machines, speed-governing means for one of said machines, means for connecting said machines together and control means therefor adapted to synchronize the speeds and certain electrical characteristics of said machines, the functioning of said control means being initiated upon the obtaining of a predetermined load upon the other of said machines, of additional means for controlling the operation of said speed-governing means after said machines are synchronized to return said governing means to a predetermined position.

In testimony whereof, we have hereunto subscribed our names this 12th day of July, 1922.

WILLIAM M. BRADSHAW.
JOHN H. ASHBAUGH.